United States Patent
Uemura

(10) Patent No.: US 9,576,539 B2
(45) Date of Patent: Feb. 21, 2017

(54) LIGHT SOURCE APPARATUS AND METHOD FOR CONTROLLING SAME

(71) Applicant: CANON KABUSHIKI KAISHA, Tokyo (JP)

(72) Inventor: Kiyohiro Uemura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 219 days.

(21) Appl. No.: 14/527,693

(22) Filed: Oct. 29, 2014

(65) Prior Publication Data

US 2015/0123888 A1 May 7, 2015

(30) Foreign Application Priority Data

Nov. 5, 2013 (JP) ................. 2013-229697

(51) Int. Cl.
*G09G 3/36* (2006.01)
*G09G 3/34* (2006.01)
*H05B 37/02* (2006.01)

(52) U.S. Cl.
CPC .......... *G09G 3/3406* (2013.01); *G09G 3/3426* (2013.01); *H05B 37/0218* (2013.01); *G09G 2320/064* (2013.01); *G09G 2320/0646* (2013.01); *G09G 2360/141* (2013.01); *Y02B 20/46* (2013.01)

(58) Field of Classification Search
CPC ............... G09G 3/3406; G09G 3/3426; G09G 2320/064; G09G 2360/141; H05B 37/0218; Y02B 20/46
USPC ........................................................ 345/102
See application file for complete search history.

(56) References Cited

U.S. PATENT DOCUMENTS

| 8,368,637 | B2* | 2/2013 | Choi ................... | G09G 3/3426 345/102 |
| 9,262,968 | B2* | 2/2016 | Takayanagi ........... | G06F 3/1423 |
| 2009/0167194 | A1* | 7/2009 | Mizuta ................ | G09G 3/2088 315/151 |
| 2011/0058119 | A1* | 3/2011 | Shiratori ............... | G02F 1/1336 349/61 |
| 2013/0249958 | A1* | 9/2013 | Matsuura ............. | G09G 3/3426 345/690 |
| 2013/0265336 | A1* | 10/2013 | Kikkawa ................ | G09G 3/001 345/690 |

(Continued)

FOREIGN PATENT DOCUMENTS

JP H11-295689 A 10/1999

*Primary Examiner* — Jason Olson
(74) *Attorney, Agent, or Firm* — Fitzpatrick, Cella, Harper & Scinto

(57) ABSTRACT

A light source apparatus includes a light source, a detection unit configured to detect light emitted by the light source, a determination unit configured to determine a target brightness, and a control unit configured to periodically perform control of light emission from the light source, wherein the control unit divides one period of the control into a first period during which the light source is caused to emit light that is to be detected by the detection unit and a second period during which the light source is caused to emit light at the target brightness, and during the first period, drives the light source using a driving signal with a value smaller than a value during the second period, and the detection unit detects light emitted by the light source during the first period.

17 Claims, 16 Drawing Sheets

(56) References Cited

U.S. PATENT DOCUMENTS

2014/0092001 A1\* 4/2014 Kikkawa .............. G09G 3/3406
    345/102
2016/0111047 A1\* 4/2016 Yamato ................ G09G 3/3406
    345/102

\* cited by examiner

FIG. 3

| LIGHT SOURCE POSITION (x, y) || REFERENCE SENSOR VALUE |
|---|---|---|
| x | y | |
| 1 | 1 | 1100 |
| 2 | 1 | 1080 |
| 3 | 1 | 1070 |
| 4 | 1 | 1090 |
| ... | ... | ... |
| ... | ... | ... |
| 6 | 6 | 1040 |
| 7 | 6 | 1130 |
| 8 | 6 | 1105 |

FIG. 6

| ls_cnt | LIGHT SOURCE POSITION | SENSOR POSITION |
|---|---|---|
| 0 | 1,1 | 1,1 |
| 1 | 1,2 | 1,1 |
| 2 | 1,3 | 1,2 |
| 3 | 1,4 | 1,2 |
| 4 | 1,5 | 1,3 |
| 5 | 1,6 | 1,3 |
| ... | ... | ... |
| ... | ... | ... |
| ... | ... | ... |
| 45 | 6,6 | 3,3 |
| 46 | 6,7 | 3,4 |
| 47 | 6,8 | 3,4 |

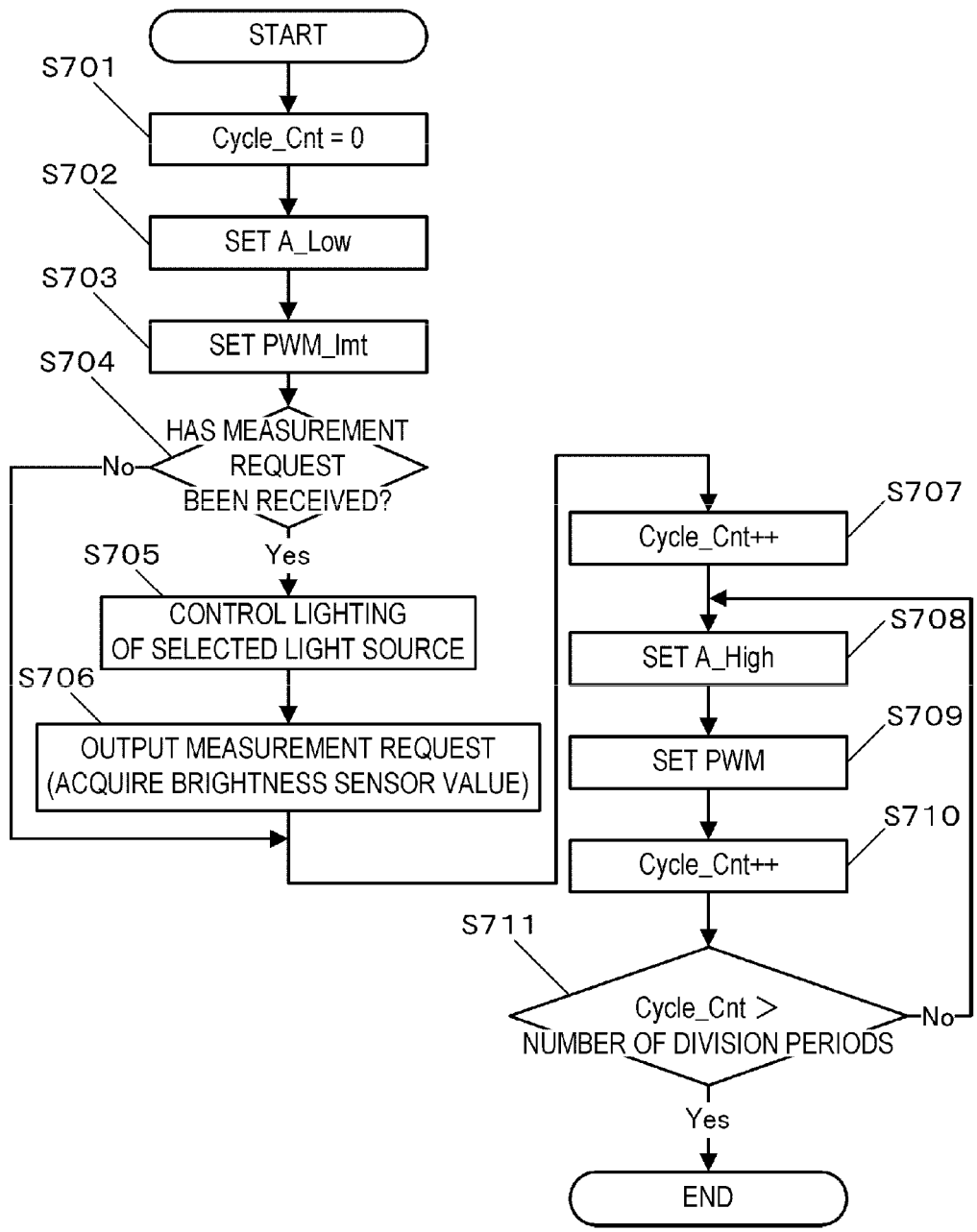

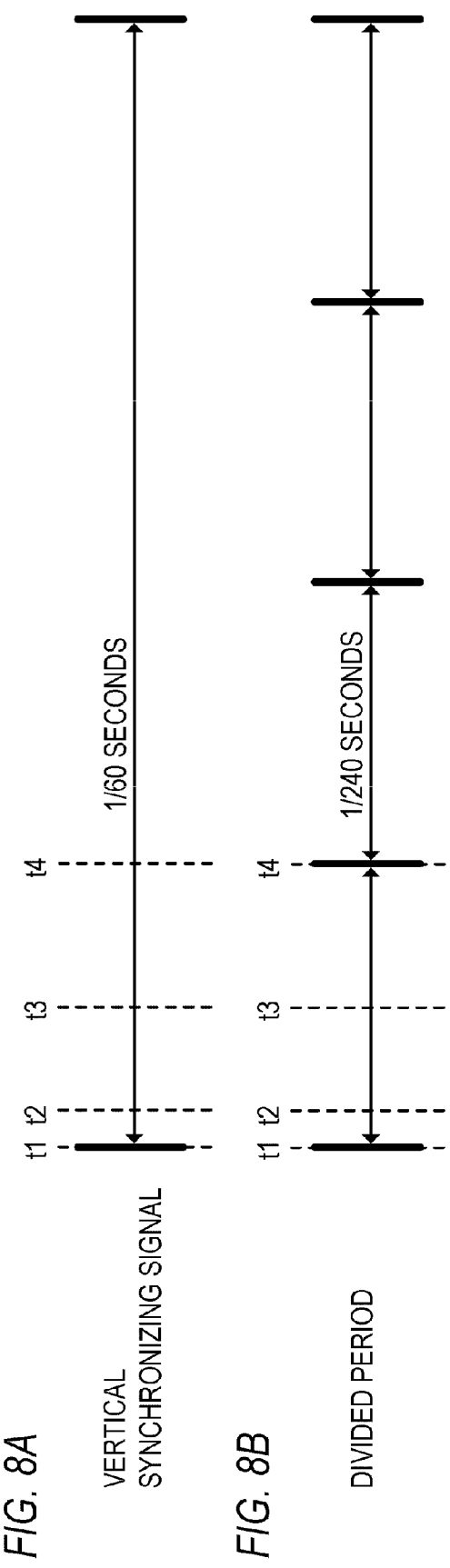

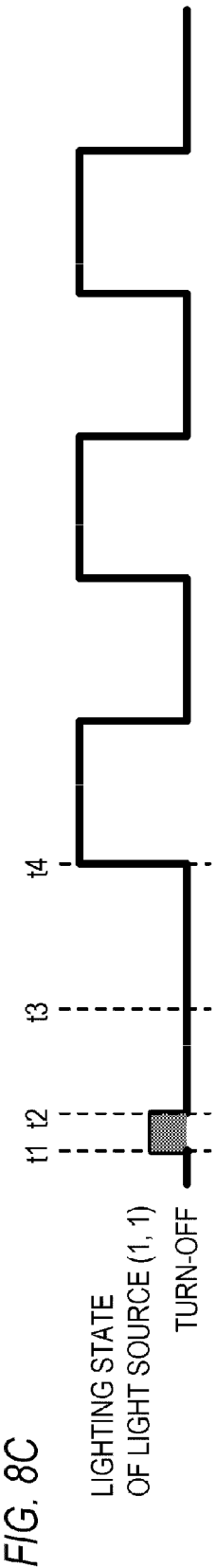
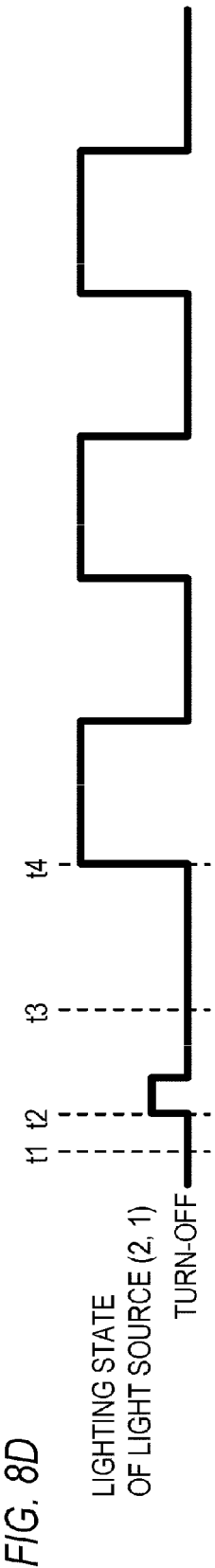
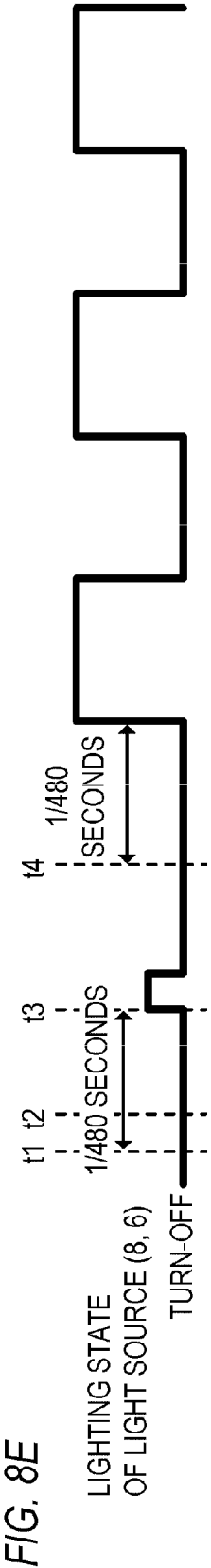
FIG. 8C
FIG. 8D
FIG. 8E

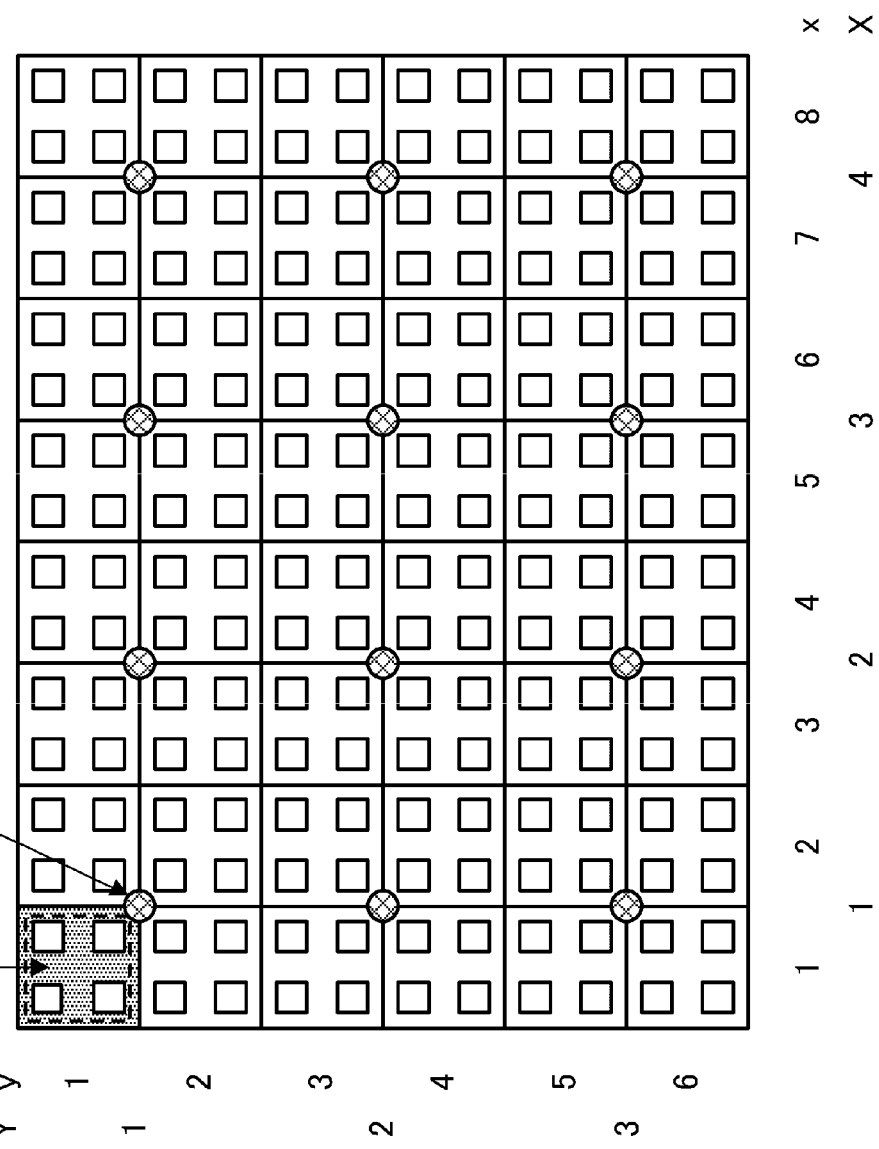

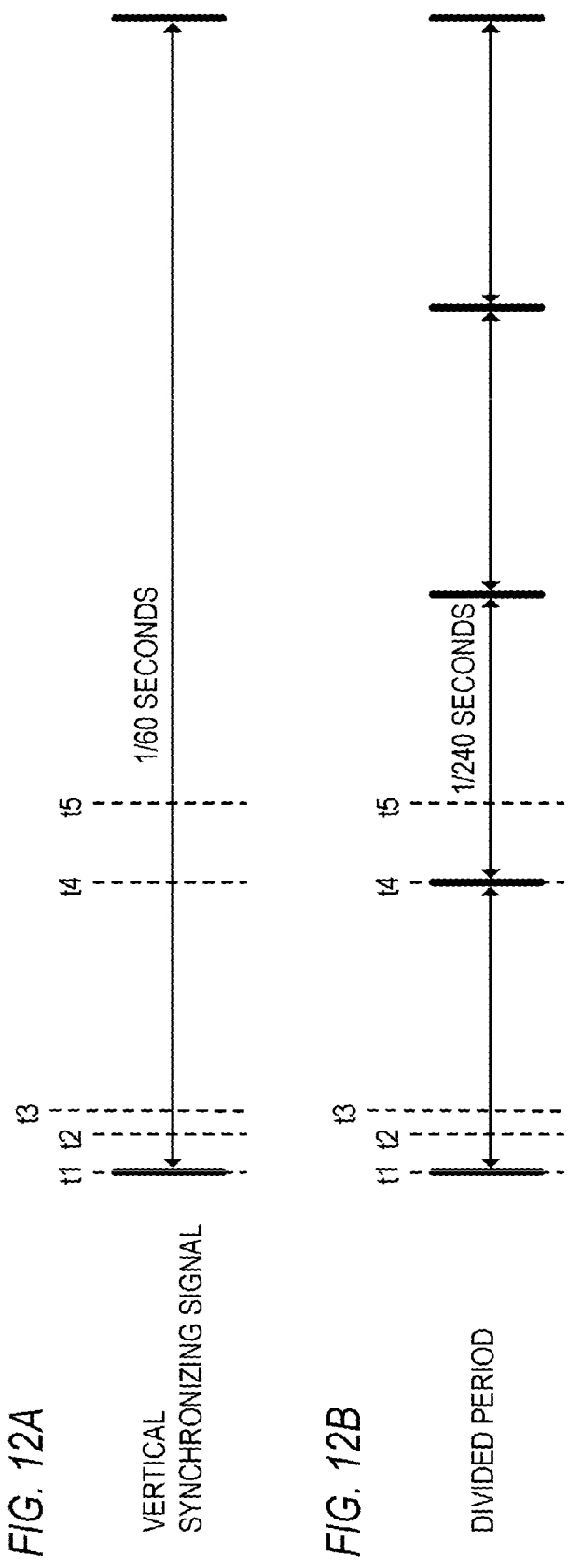

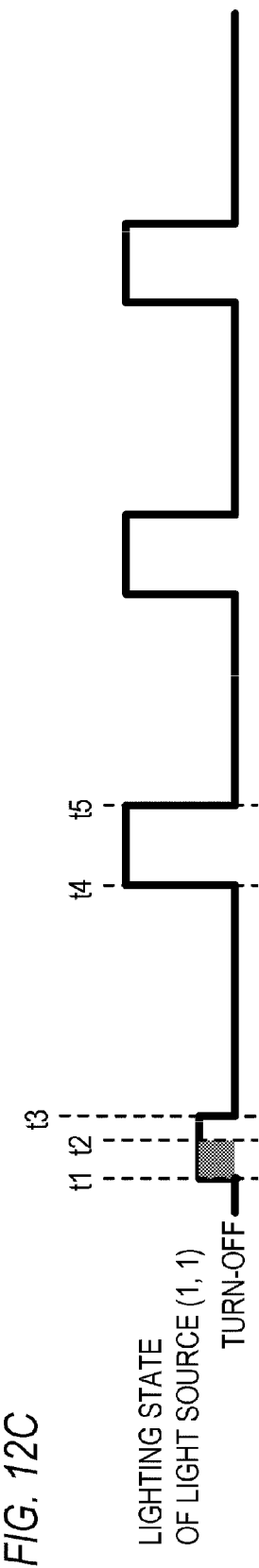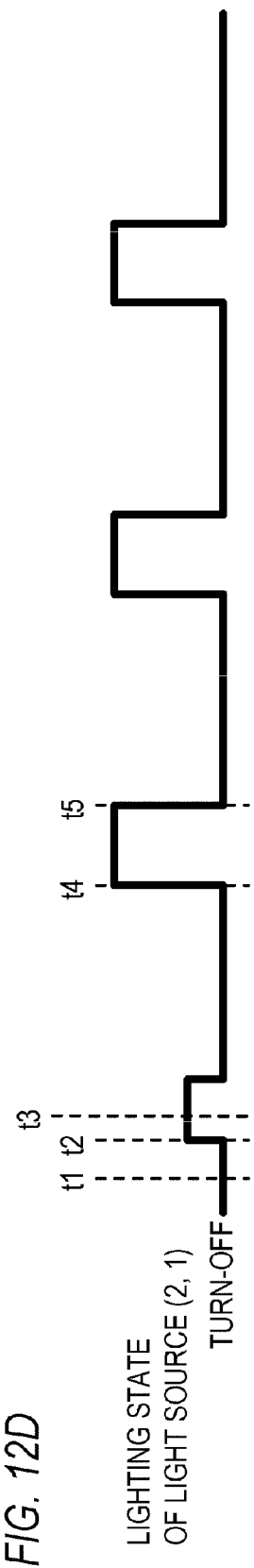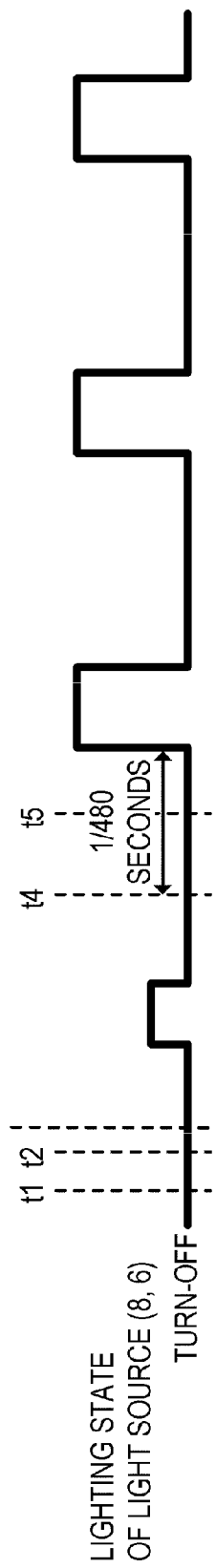

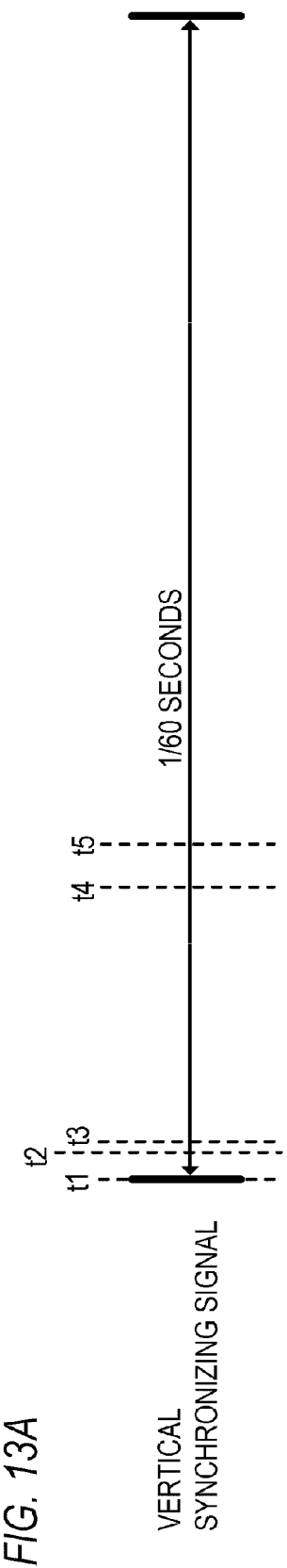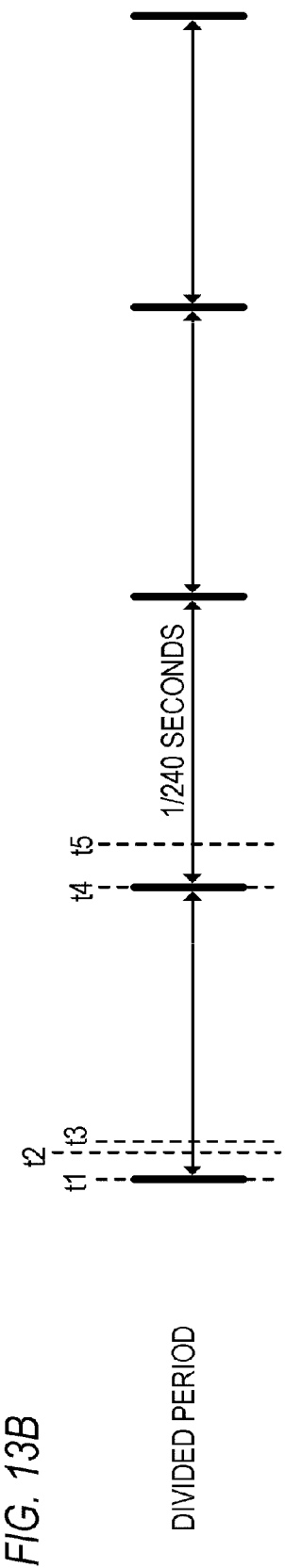
FIG. 13A
FIG. 13B

LIGHT SOURCE APPARATUS AND METHOD FOR CONTROLLING SAME

BACKGROUND OF THE INVENTION

Field of the Invention

The present invention relates to a light source apparatus and a method for controlling the light source apparatus.

Description of the Related Art

In recent years, more and more users of display apparatuses expect a higher level of image quality such as brightness stability, brightness gradation characteristics, and contrast. There have also been an increasing number of opportunities of using light emitting diodes (LEDs) as alight source for a backlight of a liquid crystal display apparatus.

In a light source apparatus such as the backlight, the emission brightness of a light source (the light source provided in the light source apparatus) may change as a result of an environmental change such as a temperature change or a temporal change.

Thus, a technique has been proposed in which light emitted by the light source is detected by a light sensor (brightness sensor) and in which the emission brightness of the light source is feedback-controlled so as to make a detected value from the light sensor constant (Japanese Patent Application Laid-open No. H11-295689). Such feedback control allows the emission brightness of the light source to be kept constant and enables a reduction in the brightness unevenness of light emitted by the light source apparatus.

Furthermore, when the liquid crystal display apparatus displays a black image, a liquid crystal panel fails to completely block light emitted by the backlight, leading to black floating.

Thus, a technique has been proposed which involves reducing the emission brightness of any of a plurality of light sources provided in the backlight that corresponds to a low-brightness area of input image data. Such control of the emission brightness is called "local dimming control". Such local dimming control allows black floating to be suppressed to increase the contrast of a displayed image (an image displayed on a screen). Furthermore, the contrast of the display apparatus can further be improved by performing local dimming control and correcting the input image data so as to reduce a change in display brightness (brightness on the screen) resulting from a change in the emission brightness of the light source.

Examples of a method for controlling the emission brightness (the amount of light emission) of the light source include pulse-amplitude modulation control (PAM control) and pulse width modulation control (PWM control).

The PAM control is a control method of changing the value (pulse amplitude) of a driving signal (voltage or current) supplied to the light source to change the emission brightness of the light source.

The PWM control is a control method of changing the time (pulse width) for which the driving signal is supplied to the light source, that is, the lighting time of the light source. In the local dimming control and the feedback control, the emission brightness of the light source is generally controlled by performing PWM control.

SUMMARY OF THE INVENTION

However, the local dimming control or the like may control the emission brightness of the light source to a very small value. As a result, a single lighting time of the light source may be shorter than a needed detection time needed for the light sensor to detect light. This may prevent accurate light detection.

Furthermore, when the lower limit value of the lighting time of the light source is limited to the needed detection time, the emission brightness of the light source fails to be controlled to the desired value. This reduces the contrast improvement effect exerted by the local dimming control.

An object of the present invention is to provide a technique that enables the light source to emit light at the desired brightness while allowing the light to be accurately detected.

The present invention in its first aspect provides
a light source apparatus comprising:
a light source;
a detection unit configured to detect light emitted by the light source;
a determination unit configured to determine a target brightness for the light source; and
a control unit configured to periodically perform control of light emission from the light source,
wherein the control unit divides one period of the control into a first period during which the light source is caused to emit light that is to be detected by the detection unit and a second period during which the light source is caused to emit light at the target brightness determined by the determination unit, and
during the first period, drives the light source using a driving signal with a value smaller than a value during the second period, and
the detection unit detects light emitted by the light source during the first period.

The present invention in its second aspect provides
a method for controlling a light source apparatus including:
a light source; and
a detection unit configured to detect light emitted by the light source,
the method comprising:
a determination step of determining a target brightness for the light source; and
a control step of periodically perform control of light emission from the light source,
wherein, in the control step,
one period of the control is divided into a first period during which the light source is caused to emit light that is to be detected by the detection unit and a second period during which the light source is caused to emit light at the target brightness determined in the determination step, and
during the first period, the light source is drove using a driving signal with a value smaller than a value during the second period, and
the detection unit detects light emitted by the light source during the first period.

The present invention in its third aspect provides a non-transitory computer readable medium that stores a program, wherein the program causes a computer to execute the method.

The present invention enables the light source to emit light at the desired brightness while allowing the light to be accurately detected.

Further features of the present invention will become apparent from the following description of exemplary embodiments with reference to the attached drawings.

BRIEF DESCRIPTION OF THE DRAWINGS

FIG. 3 is a diagram depicting an example of a reference sensor value table according to Embodiment 1;

FIG. 6 is a diagram depicting an example of a selection order table according to Embodiment 1;

FIG. 7 is a flow diagram depicting an example of operation of a backlight lighting control unit according to Embodiment 1;

FIGS. 8A to 8E are timing diagrams depicting an example of operation of a backlight lighting control unit according to Embodiment 1;

FIG. 9 is a diagram depicting an example of a selection light source and a selection sensor according to Embodiment 1;

FIGS. 12A to 12E are timing diagrams depicting an example of operation of a backlight lighting control unit according to Embodiment 2; and FIGS. 13A to 13E are timing diagrams depicting an example of operation of the backlight lighting control unit according to Embodiment 2.

DESCRIPTION OF THE EMBODIMENTS

Embodiment 1

A light source apparatus and a method for controlling the light source apparatus according to Embodiment 1 will be described.

An example will be described below in which the light source apparatus according to Embodiment 1 is used in a display apparatus that displays images on a screen by modulating light emitted by the light source apparatus. However, the light source apparatus according to Embodiment 1 is not limited to the example. The light source apparatus according to Embodiment 1 may be, for example, a lighting apparatus for street lighting or interior illumination.

An embodiment will be described below in which the display apparatus according to Embodiment 1 is a transmissive liquid crystal display apparatus. However, the display apparatus according to Embodiment 1 is not limited to the example. The display apparatus according to Embodiment 1 may be a display apparatus that displays images on the screen by modulating light emitted by the light source apparatus. For example, the display apparatus according to Embodiment 1 may be a reflective liquid crystal display apparatus. Furthermore, the display apparatus according to Embodiment 1 may be a micro electro mechanical system (MEMS) shutter display using a MEMS shutter instead of liquid crystal elements.

Figure 1:
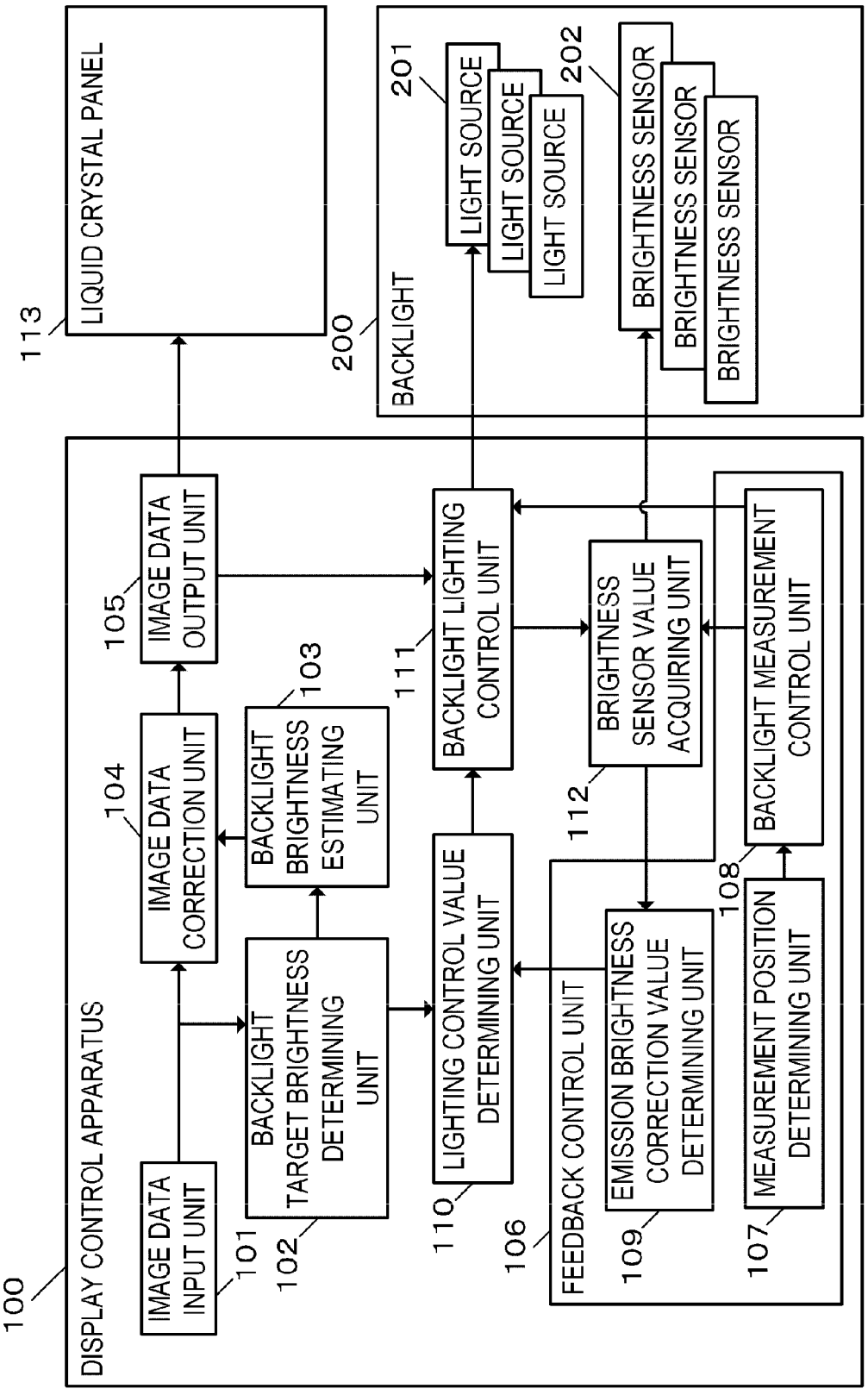
FIG. 1 is a block diagram depicting an example of a functional configuration of a display apparatus according to Embodiment 1.

FIG. 1 is a block diagram depicting an example of a functional configuration of the display apparatus according to Embodiment 1.

The display apparatus according to Embodiment 1 has, for example, a display control apparatus 100, a liquid crystal panel 113, a backlight 200. A light source apparatus according to Embodiment 1 is constituted by the backlight 200 and a part or all of the display control apparatus 100.

The liquid crystal panel 113 displays an image on a screen in accordance with image data output by the display control apparatus 100 (specifically, an image data output unit 105 to be described later). Specifically, the liquid crystal panel 113 has a plurality of liquid crystal elements and controls the transmittance of each of the liquid crystal elements in accordance with the image data output by the image data output unit 105. Light emitted by the backlight 200 passes through the liquid crystal elements to display an image on the screen.

Figure 2:
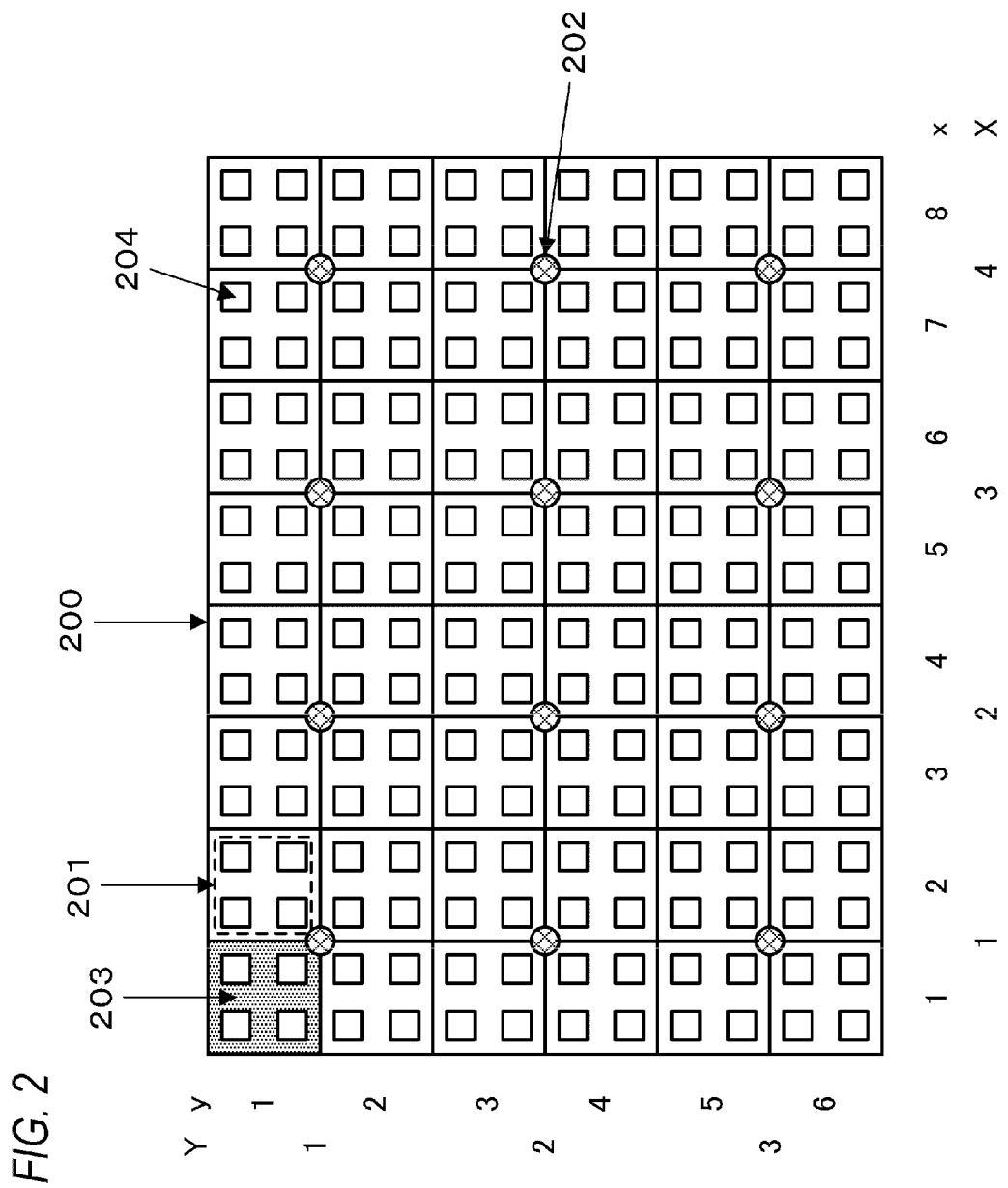
FIG. 2 is a diagram depicting an example of a hardware configuration of a backlight according to Embodiment 1.

The backlight 200 has a light source 201 and a brightness sensor 202 that detects light emitted by the light source 201. The light emitted by the backlight 200 (a light source 201 provided in the backlight 200) is irradiated on a rear surface of the liquid crystal panel 113. As depicted in FIG. 2, in Embodiment 1, the area of the screen (the light emitting surface of the backlight 200) includes 48 divided areas 203 in six rows and eight columns. One light source 201 is provided for each of the divided areas 203. The one light source 201 has four LEDs 204. One bright sensor 202 is provided for every four divided areas 203 in two rows and two columns.

In Embodiment 1, an example will be described in which the backlight has 48 light sources. However, Embodiment 1 is not limited to the example. The number of light sources (that is, the number of divided areas) provided in the backlight may be larger or smaller than 48. The number of light sources provided in the backlight may be one.

In Embodiment 1, an example will be described in which light emitting elements are LEDs, but Embodiment 1 is not limited to the example. For example, the light emitting elements may be organic EL elements, cold cathodes, or the like.

In Embodiment 1, an example will be described in which a light sensor that detects light emitted by the light source is a brightness sensor that detects the brightness (luminance) of the light emitted by the light source. However, Embodiment 1 is not limited to the example. For example, the light sensor may be a light amount sensor that detects the amount of light emitted by the light source.

In Embodiment 1, an example will be described in which one light source has four light emitting elements. However, Embodiment 1 is not limited to the example. One light source may have more or less than four light emitting elements. One light source may have one light emitting element.

In Embodiment 1, an example will be described in which one light sensor is provided for four divided areas (four light sources). However, Embodiment 1 is not limited to the example. One light sensor may be provided for more than four divided areas or for less than four divided areas. One light sensor may be provided for each divided area.

The display control apparatus 100 has, for example, an image data input unit 101, a backlight target brightness determining unit 102, a backlight brightness estimating unit 103, an image data correcting unit 104, an image data output unit 105, a feedback control unit 106, a lighting control value determining unit 110, a backlight lighting control unit 111, and a brightness sensor value acquiring unit 112.

The display control apparatus 100 has, for example, a ROM, a RAM, and a CPU none of which is depicted in the drawings. At least some of a plurality of functional units depicted in FIG. 1 (the plurality of functional units provided in the display control apparatus 100) are implemented by the CPU by executing programs stored in the ROM. The RAM is used as a work memory when a program stored in the ROM is executed.

The display control apparatus 100 performs time management using a timer function of the CPU. For example, a point in time when an operation of powering on the display apparatus is performed is set to zero, and time measurement is started.

The image data input unit 101 externally acquires image data, decodes the acquired input image data, and outputs the decoded image data to the image data correcting unit 104 and the backlight target brightness determining unit 102. The image data are acquired from a personal computer (PC) not depicted in the drawings via a signal line such as a digital visual interface (DVI).

The decoded image data may be acquired. In that case, the acquired image data are output to the image data correcting unit 104 and the backlight target brightness determining unit 102.

The backlight target brightness determining unit 102 determines a target brightness for each of the light sources. In Embodiment 1, the target brightness for each light source is determined based on image data displayed by the display apparatus (image data output by the image data input unit 101). For example, the target brightness for each light source is determined so as to be lower in dark areas of the image data than in bright areas of the image data. Specifically, for each of the divided areas, a characteristic value indicative of the brightness of image data to be displayed in the divided area is acquired from the image data output by the image data input unit 101. Then, for each divided area, the target brightness for the light source corresponding to the divided area is determined such that the target brightness increases consistently with the brightness indicated by the characteristic value. The target brightness is determined, for example, using information (tables or functions) indicative of the correspondence between the characteristic value and the target brightness. The backlight target brightness determining unit 102 outputs backlight target brightness information indicative of the target brightness for each light source to the backlight brightness estimating unit 103 and the lighting control value determining unit 110.

A method for determining the target brightness is not limited to the above-described method. For example, the target brightness for each light source may be determined using a method other than the above-described method so that the target brightness is lower in dark areas of the image data than in bright areas of the image data. Alternatively, the target brightness for each light source may be determined in accordance with a user operation (for example, a user operation of changing the emission brightness of the light source).

The backlight brightness estimating unit 103 estimates, based on the backlight target brightness information, the distribution, in the direction of the light emitting surface of the backlight 200, of brightness of light emitted by the backlight 200 when all the light sources are turned on. Then, the backlight brightness estimating unit 103 outputs brightness distribution information indicative of the brightness distribution to the image data correcting unit 104.

If light from a light source leaks to a divided area other than the divided area corresponding to the light source, the brightness distribution is preferably estimated taking such leakage of light into account.

The image data correcting unit 104 corrects the image data output by the image data input unit 101 based on the brightness distribution information so as to reduce a change in display brightness (the brightness on the screen) caused by a change in the target brightness (emission brightness) of the light source. Then, the image data correcting unit 104 outputs the corrected image data to the image data output unit 105.

The image data output unit 105 outputs the image data output by the image data correcting unit 104 to the liquid crystal panel 113 and outputs a vertical synchronizing signal for the image data to the backlight lighting control unit 111.

The feedback control unit 106 executes a process of determining an emission brightness correction value for each light source every predetermined time.

The emission brightness correction value is a correction value used to reduce a change in the emission brightness of the light source caused by an environmental change including a temperature change and a temporal change.

As described below in detail, in Embodiment 1, the emission brightness correction value is determined every predetermined time, and the determined emission brightness correction value is used to correct a lighting control value. This allows feedback control such that the emission brightness of the light source is equal to the target brightness.

The lighting control value is a control value used to control the emission brightness of the light source. When the PWM control is performed in which the emission brightness of the light source is changed by changing the time (pulse width) for which the driving signal (voltage or current) is supplied to the light source, that is, the lighting time of the light source, the pulse width is used as the lighting control value. When the PAM control is performed in which the emission brightness of the light source is changed by changing the value of the driving signal (pulse amplitude) supplied to the light source, the pulse amplitude is used as the lighting control value. When the emission brightness of the light source is changed to implement control by changing both the pulse width and the pulse amplitude, the pulse width and the pulse amplitude are used as lighting control values. In Embodiment 1, an example in which the PWM control is performed will be described.

The feedback control unit 106 has, for example, a measurement position determining unit 107, a backlight measurement control unit 108, and an emission brightness correction value determining unit 109.

The measurement position determining unit 107 selects the light source for which the emission brightness correction value is to be determined. The measurement position determining unit 107 then outputs light source information indicative of the selected light source and brightness sensor information indicative of the brightness sensor (selected sensor) corresponding to the selected light source to the backlight measurement control unit 108.

The backlight measurement control unit 108 outputs the brightness sensor information output by the measurement position determining unit 107 to the brightness sensor value acquiring unit 112. Furthermore, the backlight measurement control unit 108 outputs a measurement request and the light source information output by the measurement position determining unit 107, to the backlight lighting control unit 111.

The emission brightness correction value determining unit 109 acquires a brightness sensor value measured by the selected sensor from the brightness sensor value acquiring unit 112 when only the selected light source is on. The emission brightness correction value determining unit 109 then determines an emission brightness correction value used to correct the lighting control value for the selected light source, based on the acquired brightness sensor value and a reference sensor value. The reference sensor value is a reference value for the brightness sensor value, for example, a brightness sensor value at the time of shipment from the factory (the brightness sensor value of the brightness sensor corresponding to a light source when only one light source is on). In Embodiment 1, the reference value for each light source is prepared beforehand. For example, such a reference sensor value table as depicted in FIG. 3 is pre-stored in a nonvolatile memory not depicted in the drawings. In FIG. 3, the horizontal position of the light source is denoted by x, and the vertical position of the light source is denoted by y. When 48 light sources are arranged as depicted in FIG. 2, an integral number of at least 1 and at most 8 is denoted by x, and an integral number of at least 1 and at most 6 is denoted by y.

The emission brightness correction value determining unit 109 outputs the determined emission brightness correction value to the lighting control value determining unit 110.

One common reference sensor value may be prepared for the light sources.

The lighting control value determining unit 110 outputs the lighting control value for each light source to the backlight lighting control unit 111. Specifically, the lighting control value determining unit 110 executes one of the following two processes:

(1) a process of outputting an initial lighting control value for each light source read from the ROM to the backlight lighting control unit 111, and (2) a process of determining a lighting control value for each light source based on the target brightness and the emission brightness correction value and outputting the lighting control value determined for each light source to the backlight lighting control unit 111.

The initial lighting control value is an initial value for the lighting control value, for example, a lighting control value determined before shipment from the factory. For example, the initial lighting control value is such a lighting control value that sets the emission brightness of the light source to a predetermined value. In Embodiment 1, the initial lighting control value is prepared for each light source.

The initial lighting control value is preferably determined taking into account a slight amount of increase in emission brightness resulting from light emission during a first period described below.

One common initial lighting control value may be prepared for the light sources.

The backlight lighting control unit 111 controls light emission from each light source. Control of the light emission (light emission control) of each light source is periodically performed. The backlight lighting control unit 111 divides one period for light emission control into a first period and a second period. During the second period, the backlight lighting control unit 111 allows the light source to emit light at the target brightness determined by the backlight target brightness determining unit 102. Specifically, during the second period, the backlight lighting control unit 111 drives the light source at the lighting control value determined by the lighting control value determining unit 110.

In Embodiment 1, the light emission control is performed using, as one period, the signal period of the vertical synchronizing signal output by the image data output unit 105. That is, in Embodiment 1, the light emission control is performed using, as one period, the period of one frame of image data displayed by the display apparatus.

Furthermore, during the first period, the backlight lighting control unit 111 allows the selected light source to emit light that is to be detected by the selected sensor. Then, while allowing the selected light source to emit light that is to be detected by the selected sensor, the backlight lighting control unit 111 controls the light emission from the other light sources (the light sources other than the selected light source) so as to allow the selected sensor to detect only light emitted from the selected light source. Specifically, during the first period, the backlight lighting control unit 111 keeps the selected light source on for a time equal to or longer than a needed detection time needed for the brightness sensor to detect light, and while keeping the selected light source on, keeps the light sources other than the selected light source off. In that regard, the backlight lighting control unit 111 outputs a measurement request to the brightness sensor value acquiring unit 112 at a timing when the selected light source starts lighting.

The lighting control value during the first period may be a preset fixed value or may be determined based on a lighting control value during a second period.

While the selected light source is being allowed to emit light that is to be detected by the selected sensor, a light source other than the selected light source may be turned on at a range of an emission brightness value at which the brightness sensor value of the selected sensor is not affected.

The brightness sensor value acquiring unit 112 acquires a brightness sensor value from the selected sensor at the timing when the backlight lighting control unit 111 outputs a measurement request. The brightness sensor value acquiring unit 112 then outputs the acquired brightness sensor value to the emission brightness correction value determining unit 109, and outputs a notification of measurement completion to the feedback control unit 106. The notification of measurement completion may be output to any functional unit of the feedback control unit 106.

Now, an operation of the display apparatus according to Embodiment 1 will be described using a flowchart depicted in FIG. 4. Specifically, an operation for feedback control according to Embodiment 1 (feedback control of the emission brightness of the light source) will be described. For simplification of description, an example will be described in which the target brightness and the lighting control value are expressed by the same unit.

Figure 4:
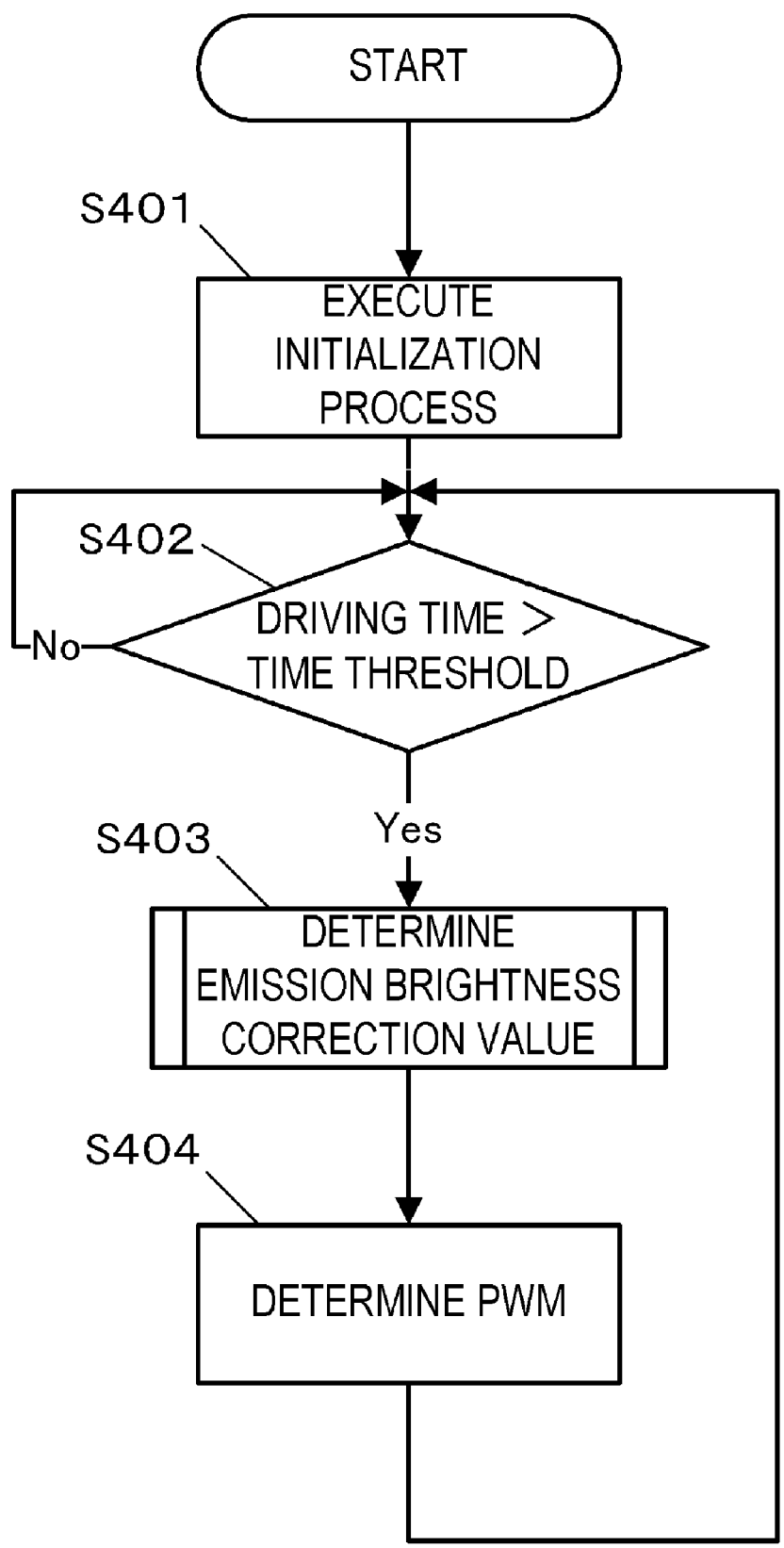
FIG. 4 is a flow diagram depicting an example of operation of the display apparatus according to Embodiment 1.

According to Embodiment 1, measurement of the driving time of the backlight is started in accordance with a user's power-on operation, and the flowchart in FIG. 4 is started. The timing at which the flowchart in FIG. 4 is started is not limited to the above-described timing. For example, the flowchart in FIG. 4 may be started in accordance with a user operation of indicating the start of feedback control of the emission brightness of the light source.

First, the lighting control value determining unit 110 outputs an initial lighting control value DefPWM to the backlight lighting control unit 111 (S401; initialization process). The backlight lighting control unit 111 sets the lighting control value and drives the backlight 200 (each light source) at the set lighting control value. Once the initialization process is executed, the initial lighting control value DefPWM is set to be the lighting control value, and each light source is driven at the initial lighting control value DefPWM.

The feedback control unit 106 determines whether or not the driving time of the backlight 200 exceeds a time threshold (S402). As described below in detail, in Embodiment 1, processing from S402 to S404 is repeatedly executed. In the first processing in S402, the feedback control unit 106 determines whether or not the driving time of the backlight 200 since the power-on operation exceeds the time threshold. In the second and subsequent processing in S402, the feedback control unit 106 determines whether or not the driving time of the backlight 200 since the last feedback control exceeds the time threshold.

The feedback control unit 106 waits until the driving time of the backlight 200 exceeds the time threshold. When the driving time of the backlight 200 exceeds the time threshold, the feedback control unit 106 executes the processing in S403.

In S403, the feedback control unit 106 determines and outputs the emission brightness correction value for each light source to the lighting control value determining unit 110.

Embodiment 1, the target brightness for each light source is determined for each frame of the image data. Acquisition of data from the plurality of brightness sensors corresponding to a plurality of sensors is performed at time intervals of vertical synchronizing signals for the image data. Thus, when 48 light sources are arranged as depicted in FIG. 2, emission brightness correction values for the 48 light sources are determined in a period of time for 48 frames.

The emission brightness correction values for all the light sources may be determined within a period of time for one frame.

Then, the lighting control value determining unit 110 determines and outputs the lighting control value PWM for each light source to the backlight lighting control unit 111 (S404). Subsequently, the backlight lighting control unit 111 updates the lighting control value to the lighting control value PWM and drives each light source at the lighting control value PWM (this will be described in detail). The lighting control value PWM is determined based on the emission brightness correction value Corr determined in S403 and the target brightness Ltgt determined by the backlight target brightness determining unit 102. In Embodiment 1, the lighting control value PWM is calculated using Formula 1. In Formula 1, the lighting control value for the light source with the horizontal position x and the vertical position y is denoted by PWM (x,y). This also applies to Ltgt(x,y) and Corr(x,y).

$$PWM(x,y)=Ltgt(x,y) \times Corr(x,y) \quad \text{(Formula 1)}$$

The method for determining the lighting control value PWM is not limited to the above-described method. For example, the lighting control value PWM may be determined using a table indicating the correspondence between the lighting control value PWM and a combination of the emission brightness correction value Corr and the target brightness Ltgt.

Subsequently, the processing returns to S402. The above-described time threshold may have any value. However, when the time threshold is 10 seconds, the processing in S403 and S404 is executed each time 10 seconds elapse.

Figure 5:
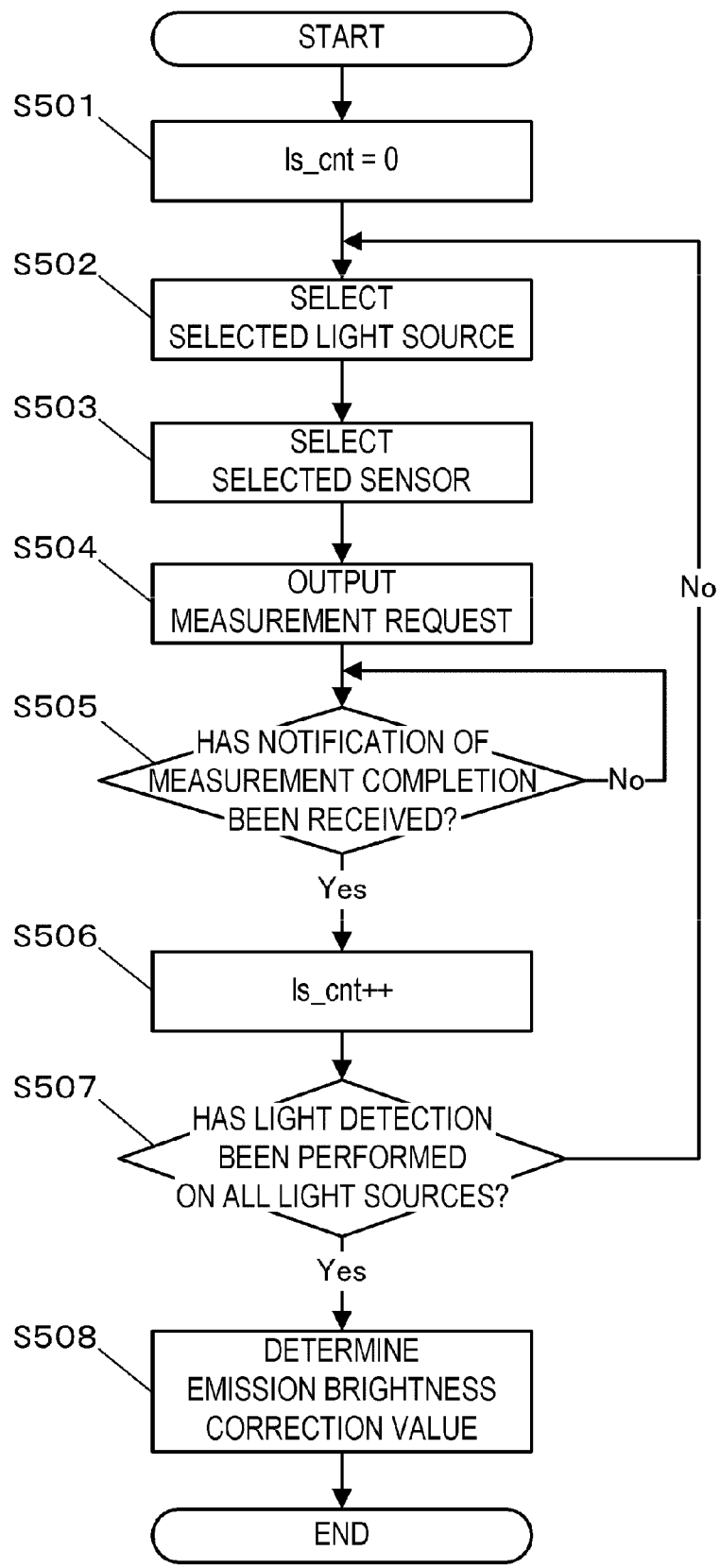
FIG. 5 is a flow diagram depicting an example of operation of a feedback control unit according to Embodiment 1.

Now, an operation of the feedback control unit 106 (processing in S403) will be described using a flowchart in FIG. 5.

First, the feedback control unit 106 sets a selection count value ls_cnt to 0 (S501). The selection count value ls_cnt may be set by any functional unit of the feedback control unit 106.

Then, the measurement position determining unit 107 uses a prepared selection order table to select the light source corresponding to the selection count value ls_cnt as the selected light source (S502). The selection order table is a table indicating the order of the selected light source and the correspondence between the selection count value ls_cnt and the light source (FIG. 6). In the example in FIG. 6, the selection count value ls_cnt=0 is associated with the light source with the position (x,y)=(1,1). Thus, for the selection count value ls_cnt=0, the light source with the position (1,1) is selected as the selected light source. Furthermore, the selection order table in FIG. 6 also indicates the order of the selected sensor. Specifically, the selection order table in FIG. 6 also indicates the correspondence between the selection count value ls_cnt and the combination of the light source and the brightness sensor.

The table indicating the order of the selected sensor may be prepared separately from the table indicating the selected light source.

The measurement position determining unit 107 uses the selection order table to select the brightness sensor corresponding to the selection count value ls_cnt as the selected sensor (S503). In the example in FIG. 6, the selection count value ls_cnt=0 is associated with the brightness sensor with the position (X,Y)=(1,1). Thus, for the selection count value ls_cnt=0, the brightness sensor with the position (1,1) is selected as the selected sensor. The horizontal position of the brightness sensor is denoted by X. The vertical position of the brightness sensor is denoted by Y. When 12 brightness sensors are arranged as depicted in FIG. 2, an integral number of at least 1 and at most 4 is denoted by X, and an integral number of at least 1 and at most 3 is denoted by Y.

Either the processing in S502 or the processing in S503 may be executed earlier. For example, the processing in S502 may follow the processing in S503.

The measurement position determining unit 107 outputs information indicative of the selected light source selected in S502 and the selected sensor selected in S503 to the backlight measurement control unit 108.

Then, the backlight measurement control unit 108 outputs the brightness sensor information indicative of the selected sensor to the brightness sensor value acquiring unit 112, and outputs a measurement request and the light source information indicative of the selected light source to the backlight lighting control unit 111 (S504).

Then, the feedback control unit 106 waits to receive the notification of measurement completion from the brightness sensor value acquiring unit 112 (S505). At this time, the emission brightness correction value determining unit 109 receives, from the brightness sensor value acquiring unit 112, the brightness sensor value measured by the selected sensor when only the selected light source is on.

Using the received notification of measurement completion as a trigger, the feedback control unit 106 counts up the selection count value ls_cnt by one (S506).

Then, the feedback control unit 106 determines, based on the selection count value ls_cnt, whether or not detection of light from the light source (light detection) has been performed on all the light sources (S507).

When the light detection has not been performed on any light source, the processing returns to S502.

The processing from S502 to S507 is repeatedly executed until the light detection is performed on all the light sources. Once the light detection is performed on all the light sources, the processing proceeds to S508.

When 48 light sources are arranged as depicted in FIG. 2, the processing from S502 to S507 is repeatedly executed until the selection count value ls_cnt=48.

In S508, the emission brightness correction value determining unit 109 determines the emission brightness correction value Corr for each light source. The emission brightness correction value Corr is determined based on an acquired brightness sensor value Scur and a prepared reference value Sbase. In Embodiment 1, the emission brightness correction value Corr is calculated using Formula 2. In Formula 2, the brightness sensor value Scur (x,y) is a brightness sensor value as measured by the selected sensor when only the selected light source, with the horizontal position x and the vertical position y, is on. The reference sensor value Sbase(x,y) is the reference sensor value for the light source with the horizontal position x and the vertical position y.

$$\text{Corr}(x,y) = S\text{base}(x,y)/S\text{cur}(x,y) \qquad \text{(Formula 2)}$$

The method for determining the emission brightness correction value Corr is not limited to the above-described method. For example, the emission brightness correction value Corr may be determined using a table indicating the correspondence between the emission brightness correction value Corr and a combination of the brightness sensor value Scur and the reference sensor value Sbase.

Now, the operation of the backlight lighting control unit 111 will be described in detail using a timing chart depicted in FIGS. 8A to 8E.

An example will be described in which the selection count value ls_cnt=0, the light source with the position (x,y)=(1,1) is selected as the selected light source, and the brightness sensor with the position (X,Y)=(1,1) is selected as the selected sensor, as depicted in FIG. 9. The light source with the position (x,y) is hereinafter referred to as the "light source (x,y)". The brightness sensor with the position (X,Y) is hereinafter referred to as the "brightness sensor (X,Y)".

Furthermore, in this case, one period of the vertical synchronizing signal is 1/60 seconds, as depicted in FIG. 8A.

The backlight lighting control unit 111 controls the light emission from each light source at a period of 1/60 seconds. Specifically, as depicted in FIG. 8B, the backlight lighting control unit 111 divides one period of light emission control (1/60 seconds) into four divided periods, 1/240 second each (one first period and three second periods). The backlight lighting control unit 111 then performs light emission control based on the PWM control on each of the four divided periods.

In the example described herein, one period of light emission control is divided into one first period and three second periods. However, the number of the second periods is not limited to three. The number of the second periods may be more or less than three. A single second period may be provided.

The light source (1,1) is PWM-controlled such that lighting is started at the start time of each divided period. For example, the light source (1,1) is PWM-controlled to start lighting at the start time t1 of the first period, as depicted in FIG. 8C. Furthermore, the light source (1,1) is PWM-controlled to start lighting at the start time of the second period (for example, a point in time t4). Embodiment 1 assumes that light sources with the same vertical position are PWM-controlled to start lighting at the same point in time. For example, the light source (2,1) is also PWM-controlled to start lighting at the start time of the divided period as depicted in FIG. 8D. The reason why, during the first period, the lighting period of the light source (1,1) fails to overlap the lighting period of the light source (2,1) will be described below.

The light sources with x=2, 3, 4, 5 and 6 are PWM-controlled to start lighting 1/2,400 seconds, 1/1,200 (=2/2,400) seconds, 1/800 (=3/2,400) seconds, 1/600 (=4/2,400) seconds, and 1/480 (=1/2,400) seconds after the start time of the divided period. For example, the light source (6,8) is PWM-controlled to start lighting 1/480 seconds after the start time t1 of the first period, that is, at a point in time t3, as depicted in FIG. 8E. Furthermore, the light source (6,8) is PWM-controlled to start lighting 1/480 seconds after the start time of the second period.

Thus, the lighting start timing varies among the light sources, allowing the power consumption of the backlight to be smoothed. The lighting start timing may be the same for all the light sources.

During the first period, the backlight lighting control unit 111 allows the selected light source (1,1) to emit light that is to be detected by the selected sensor (1,1). While allowing the selected light source (1,1) to emit light that is to be detected by the selected sensor (1,1), the backlight lighting control unit 111 controls the light emission from the light sources other than the selected light source (1,1) so as to keep the other light sources off. This is why, in FIGS. 8A to 8E, the lighting period of the light source (1,1) fails to overlap the lighting period of the light source (2,1) during the first period. In the example in FIGS. 8A to 8E, in the first period the light source (2,1) is PWM-controlled to start lighting at a lighting end time t2 of the selected light source (1,1).

During the second period, the backlight lighting control unit 111 PWM-controls each light source at the lighting control value output by the lighting control value determining unit 110. When the emission brightness correction value Corr is updated, the lighting control value output by the lighting control value determining unit 110 is also updated. As a result, the lighting time during the second period is updated. In other words, a light emission duty ratio during the second period is updated. The light emission duty ratio is the ratio of the total lighting time during the second period to the second period.

The driving signal (pulse amplitude) supplied to the light source during the first period may have any value. However, the value is preferably smaller than the pulse amplitude during the second period. The contrast of the displayed image (the image displayed on the screen) can be made higher when the pulse amplitude during the first period is smaller than the pulse amplitude during the second period, than when the pulse amplitude during the first period is larger than the pulse amplitude during the second period.

The contrast of the displayed image increases consistently with the ratio of the pulse amplitude during the second period to the pulse amplitude during the first period. However, an excessively small pulse amplitude during the first period results in an excessively small amount of light emitted by the light source during the first period. This precludes the brightness sensor from accurately detecting light. Thus, the pulse amplitude during the first period is desirably determined to provide a displayed image with a high contrast while maintaining the detection accuracy of the brightness sensor.

Now, the operation of the backlight lighting control unit 111 will be described in detail using a flowchart depicted in FIG. 7.

The flowchart in FIG. 7 is started using, as a trigger, reception of the vertical synchronizing signal from the image data output unit 105 by means of the backlight lighting control unit 111.

First, the backlight lighting control unit 111 sets a light emission control count value Cycle_Cnt to zero (S701).

Then, the backlight lighting control unit 111 sets amplitude data A_Low indicative of the pulse amplitude during the first period (S702).

The backlight lighting control unit 111 then sets a lower limit lighting control value PWM_lmt to be the lighting control value (S703). The processing in S703 may be executed before the processing in S702. In this regard, the lighting control value is indicative of the pulse width. The lower limit lighting control value PWM_lmt is indicative of, for example, the same time (pulse width) as the needed detection time needed for the brightness sensor to detect light. The need detection time is, for example, a time short enough to prevent a variation in brightness from being viewed as a flicker.

Then, the backlight lighting control unit 111 determines whether or not the backlight lighting control unit 111 has received a measurement request from the feedback control unit 106 (S704).

When the backlight lighting control unit 111 has received the measurement request, the processing proceeds to S705.

When having received no measurement request, the backlight lighting control unit 111 drives, during the first period, each light source using a driving signal with the pulse amplitude indicated by the amplitude data A_Low and the pulse width indicated by the lower limit lighting control value PWM_lmt. Then, the processing proceeds to S707.

In S705, the backlight lighting control unit 111 drives, during the first period, each light source using a driving signal with the pulse amplitude indicated by the amplitude data A_Low and the pulse width indicated by the lower limit lighting control value PWM_lmt. However, in S705, the driving timing for each light source is adjusted to set a period when only the selected light source is kept on for the time of the pulse width indicated by the lower limit lighting control value PWM_lmt (selected light source lighting control). For example, as depicted in FIG. 8C and FIG. 8D, when the light source (1,1) is the selected light source, the lighting period of the light source (2,1) is selected so as not to overlap the lighting period of the light source (1,1). The selected light source is determined based on light source information output by the backlight measurement control unit 108. When the backlight lighting control unit 111 has received no measurement request, each light source is driven such that light sources with the same vertical position can start lighting at the same timing. Thus, when the backlight lighting control unit 111 has received no measurement request, the light source (1,1) and the light source (2,1) start lighting at the same timing.

Then, the processing proceeds to S706.

In S706, the backlight lighting control unit 111 outputs a measurement request to the brightness sensor value acquiring unit 112 at the lighting start timing of the selected light source during the first period. In response to the reception of the measurement request from the backlight lighting control unit 111, the brightness sensor value acquiring unit 112 acquires a brightness sensor value from the selected sensor. In this case, only the selected light source is on, and thus, the brightness sensor value indicative only of the brightness of light from the selected sensor is acquired. The selected sensor is determined based on the brightness sensor information output by the backlight measurement control unit 108.

The processing proceeds to S707.

In S707, the backlight lighting control unit 111 increments the light emission control count value Cycle_Cnt by 1.

Then, the backlight lighting control unit 111 sets amplitude data A_High indicative of the pulse amplitude during the second period (S708).

The backlight lighting control unit 111 then sets the lighting control value PWM output by the lighting control value determining unit 110 (the value determined based on the emission brightness correction value Corr and the target brightness Ltgt) (S709). The processing in S709 may be executed before the processing in S708.

Then, the backlight lighting control unit 111 increments the light emission control count value Cycle_Cnt by 1 (S710). The backlight lighting control unit 111 also drives, during the second period, each light source at a driving signal with the pulse amplitude indicated by the amplitude data A_High and the pulse width indicated by the lighting control value PWM.

Then, the backlight lighting control unit 111 determines whether or not the light emission control count value Cycle_Cnt is larger than the number of the divided periods (S711).

When the light emission control count value Cycle_Cnt is equal to or smaller than the number of the divided periods, the processing returns to S708. Then, in S708 to S710, processing for the next second period is executed. The pulse width and the pulse amplitude may be constant or may vary among the plurality of second periods. When the pulse width and the pulse amplitude are constant among the plurality of second periods, the processing may return to S710.

When the light emission control count value Cycle_Cnt is larger than the number of the divided periods, the flow is ended.

As described above, according to Embodiment 1, one period of light emission control (control of the light emission from the light source) is divided into the first period during which the light source is allowed to emit light that is to be detected by the light sensor and the second period during which the light source is allowed to emit light at the determined target brightness. Then, light emitted by the light source during the first period is detected. This enables the light source to emit light at the desired brightness (target brightness) while allowing the light to be accurately detected. For example, even when the target brightness is set to a small value, it is possible to allow the light source to emit light at the desired brightness while accurately detecting the light. Not only the above-described effects can be exerted but also the contrast can be effectively increased by a configuration in which the target brightness is determined to be lower in dark areas of the image data than in bright areas of the image data.

The LED in the light source may provide any emission color. For example, the LED in the light source may be a white LED that emits white light. One light source may have a plurality of LEDs providing different emission colors. The emission colors and the arrangement of a plurality of LEDs in one light source may be determined such that light emitted by the plurality of LEDs is synthesized into white light.

Embodiment 1 illustrates the example in which one period of light emission control is divided into a plurality of divided periods with an equal length. However, Embodiment 1 is not limited to the example. For example, one period of light emission control may be divided into a plurality of divided periods with different lengths. One period of light emission control may be divided into one first period and a plurality of second periods each with a length different from the length of the first period. In that regard, the plurality of second periods may have different lengths or the same length.

Embodiment 1 illustrates the example in which the light sources other than the selected light source are allowed to emit light during the first period. However, the light sources other than the selected light source may not be allowed to emit light during the first period. Furthermore, when light detection is not performed (for example, the above-described feedback control is not performed), each light source may not be allowed to emit light during the first period or the first period may not be set. For example, one period of light emission control may be set to be a second period or divided into a plurality of second periods.

In Embodiment 1, the first divided period of the plurality of divided periods providing one period of light emission control is set to be the first period. However, the second divided period or any subsequent divided period may be set to be the first period.

Embodiment 1 illustrates the example in which light detection is performed on one light source during a period of one frame. However, Embodiment 1 is not limited to the example. A plurality of light detections may be performed on a plurality of light sources during a period of one frame.

Embodiment 1 illustrates the example in which brightness sensor value is used to feed back the emission brightness. However, the application of the brightness sensor value is not limited to the example. For example, the brightness sensor value may be utilized for another display apparatus.

Embodiment 1 illustrates the example in which the initial lighting control value is initially used to drive each light source. However, Embodiment 1 is not limited to the example. For example, a lighting control value appropriate to the target brightness (a value not corrected using the emission brightness correction value) may be used. When the target brightness and the lighting control value are in the same unit, first, the target brightness may be used as the lighting control value.

Embodiment 2

A light source apparatus and a method for controlling the light source apparatus according to Embodiment 2 of the present invention will be described. Only differences from Embodiment 1 will be described. A lighting control value for a first period is hereinafter referred to as a "first lighting control value". A lighting control value for a second period is hereinafter referred to as a "second lighting control value".

A general configuration of a display apparatus according to Embodiment 2 is the same as the general configuration of the display apparatus according to Embodiment 1 (FIG. 1).

A lighting control value determining unit 110 executes processing similar to the processing according to Embodiment 1.

Furthermore, the lighting control value determining unit 110 determines the first lighting control value for each light source and outputs the first lighting control value determined for each light source to the backlight lighting control unit 111. Specifically, the first lighting control value is determined such that, when a lighting time during the second period of achieving a determined target brightness changes, a lighting time during the first period changes at the change rate of the lighting time during the second period. In Embodiment 2, the first lighting control value is determined based on the second lighting control value, an initial lighting control value (initial second lighting control value), and an initial first lighting control value. The initial first lighting control value is an initial value of the first lighting control value. For example, the initial first lighting control value is a factory-configured value and is pre-stored in a nonvolatile memory.

The backlight lighting control unit 111 executes processing similar to the processing according to Embodiment 1. However, during the first period, the backlight lighting control unit 111 drives each light source at the first lighting control value output by the lighting control value determining unit 110. Then, when the time for which the lighting time during the first period is changed at the above-described change rate is shorter than a needed detection time, the backlight lighting control unit 111 sets the needed detection time as the lighting time during the first period. That is, when the lighting time indicated by the first lighting control value output by the lighting control value determining unit 110 is shorter than the needed detection time, the backlight lighting control unit 111 sets the needed detection time to be the lighting time during the first period. Thus, a possible decrease in the accuracy of light detection can be suppressed.

A process may not be executed which involves limiting the lower limit value of the lighting time during the first period to the needed detection time. During the first period, a process may constantly be executed which involves driving each light source at the first lighting control value output by the lighting control value determining unit 110.

Figure 10:
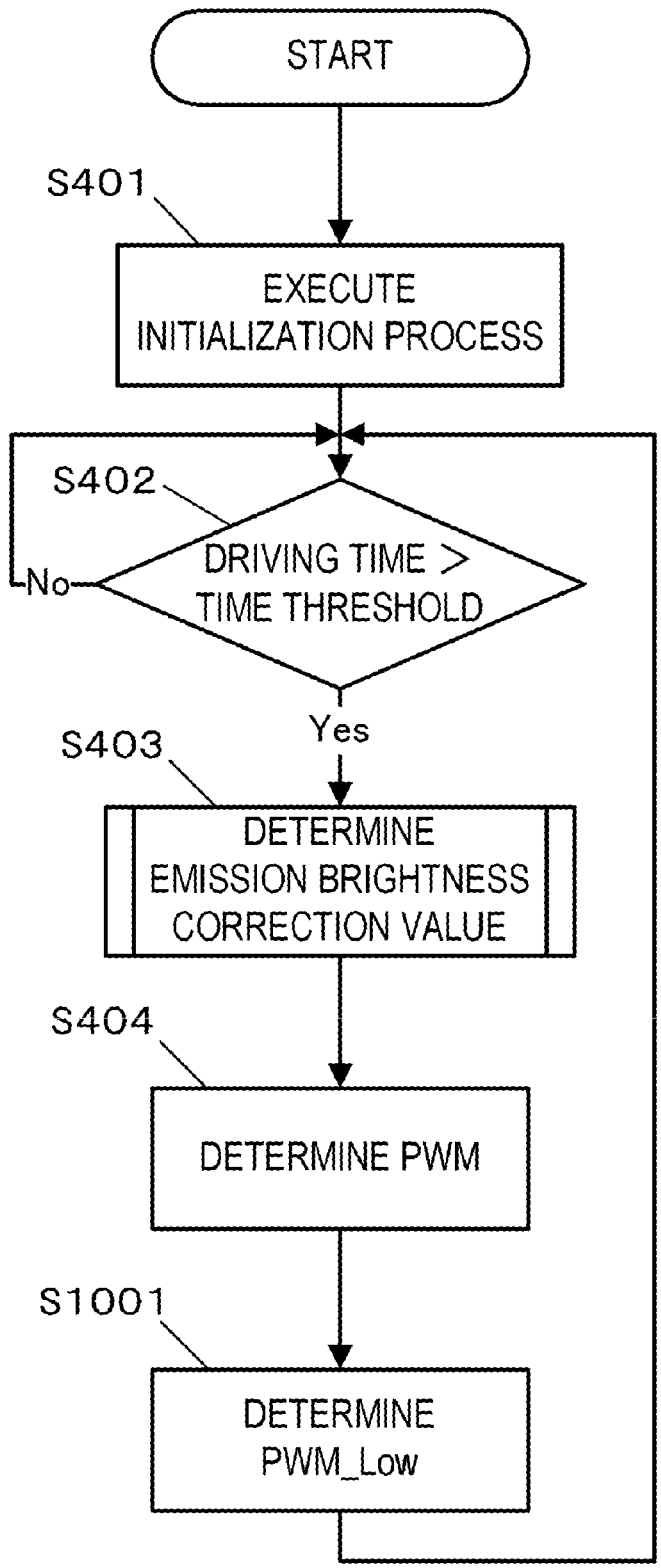
FIG. 10 is a flow diagram depicting an example of operation of a display apparatus according to Embodiment 2.

Now, an operation of the display apparatus according to Embodiment 2 will be described using a flowchart in FIG. 10.

Processing in S401 to S404 is the same as the corresponding processing according to Embodiment 1 (FIG. 4).

Subsequently to S404, the lighting control value determining unit 110 determines and outputs the first lighting control value PWM_Low for each light source to the backlight lighting control unit 111 (S1001). As described above, the first lighting control value is determined based on the second lighting control value PWM, the initial second lighting control value DefPWM, and the initial first lighting control value DefPWM_Low. According to Embodiment 2, the first lighting control value PWM_Low is calculated using:

$$PWM\_Low(x,y)=(PWM(x,y)/DefPWM(x,y))\times DefPWM\_Low(x,y) \quad \text{(Formula 3)}$$

The first lighting control value may be determined based on the current second lighting control value, the last second lighting control value, and the last first lighting control value. For example, the last second lighting control value may be substituted into the initial second lighting control value in Formula 3. The last first lighting control value may be substituted into the initial first lighting control value in Formula 3.

Figure 11:
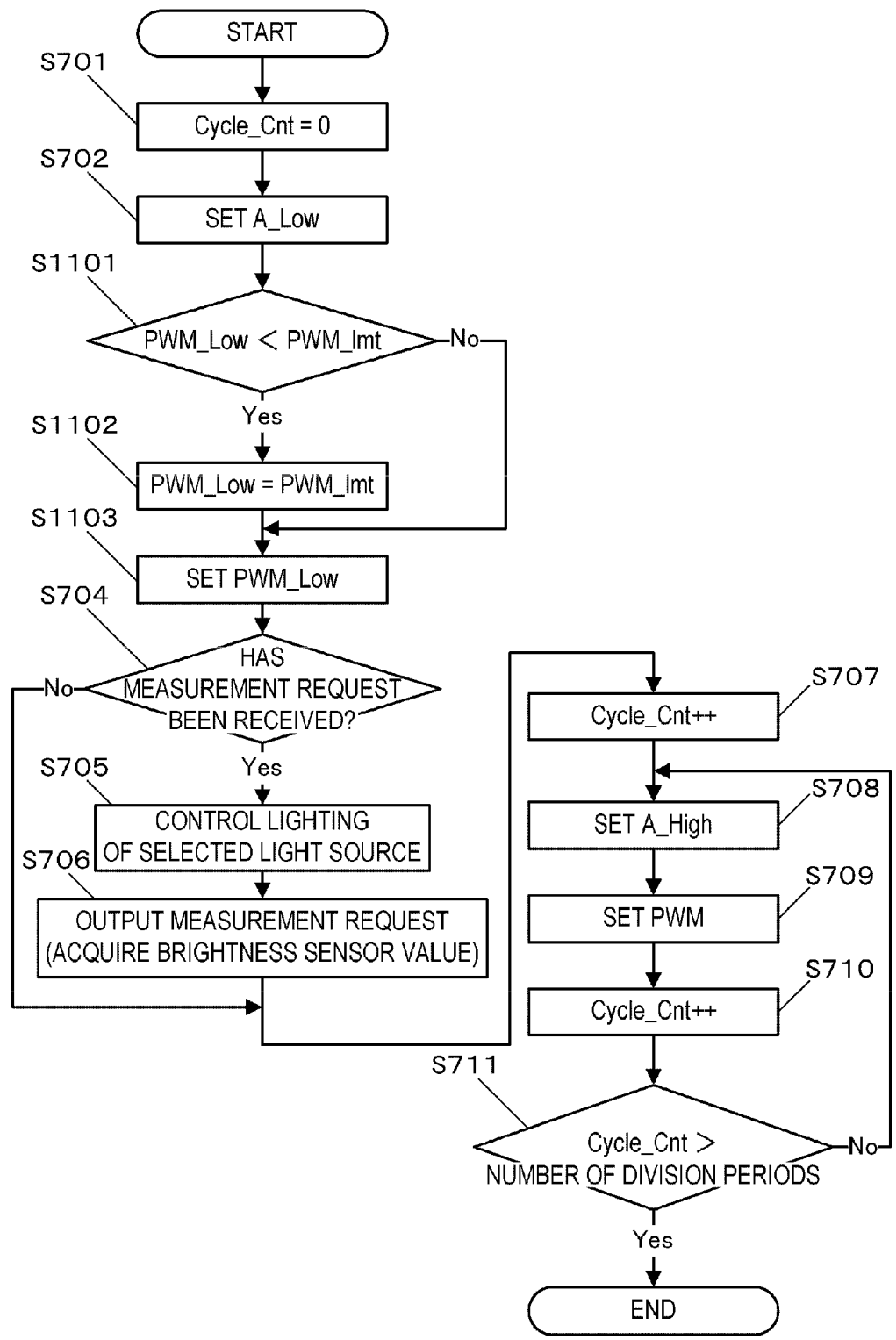
FIG. 11 is a flow diagram depicting an example of operation of a backlight lighting control unit according to Embodiment 2.

Now, the operation of the backlight lighting control unit 111 will be described in detail using a flowchart in FIG. 11.

Processing in S701 and S702 is the same as the corresponding processing according to Embodiment 1 (FIG. 7).

Subsequently to S702, the backlight lighting control unit 111 determines whether or not the first lighting control value PWM_Low output by the lighting control value determining unit 110 is smaller than the lower limit lighting control value PWM_lmt (S1101). That is, the backlight lighting control unit 111 determines whether or not the lighting time indicated by the first lighting control value PWM_Low is shorter than the needed detection time. When the first lighting control value PWM_Low is smaller than the lower limit lighting control value PWM_lmt, the processing proceeds to S1102. When the first lighting control value PWM_Low is equal to or larger than the lower limit lighting control value PWM_lmt, the processing proceeds to S1103.

In S1102, the backlight lighting control unit 111 changes the first lighting control value PWM_Low to the lower limit lighting control value PWM_lmt. Then, the processing proceeds to S1103.

In S1103, the backlight lighting control unit 111 sets the first lighting control value PWM_Low to be the lighting control value. The processing proceeds to S704. As described above, when the first lighting control value output by the lighting control value determining unit 110 is determined to be smaller than the lower limit lighting control value, the first lighting control value is changed to the lower limit lighting control value. Thus, the lower limit lighting control value is set to be the lighting control value.

Processing in S704 to S711 is the same as the corresponding processing according to Embodiment 1 (FIG. 7).

Now, the operation of the backlight lighting control unit 111 will be described in detail using a timing chart in FIGS. 12A to 12E and 13A to 13E. FIGS. 12A to 12E depicts an example in which the first lighting control value output by the lighting control value determining unit 110 is larger than the lower limit lighting control value. FIGS. 13A to 13E depicts an example in which the first lighting control value output by the lighting control value determining unit 110 is smaller than the lower limit lighting control value. Furthermore, FIGS. 12A to 12E and 13A to 13E depict an example in which a selection count value ls_cnt=0, a light source with a position (x,y)=(1,1) is selected as a selected light source, and a brightness sensor with a position (X,Y)=(1,1) is selected as a selected sensor.

FIG. 12A and FIG. 13A are the same as FIG. 8A, and FIG. 12B and FIG. 13B are the same as FIG. 8B.

Figure 13C:
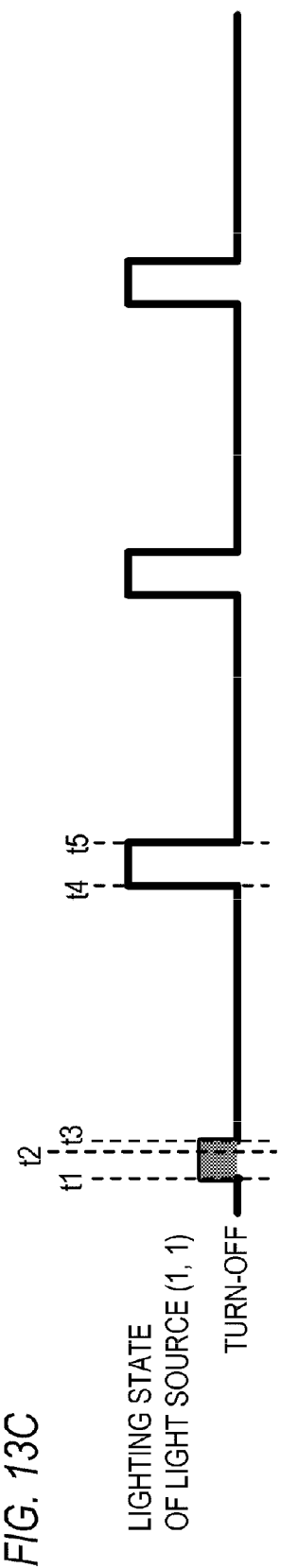

In a second period, each light source is driven at the second lighting control value output by the lighting control value determining unit 110. For example, as depicted in FIG. 12C and FIG. 13C, in the second period the light source (1,1) is driven to remain on during a period between points in time t4 and t5 as depicted in FIG. 12C and FIG. 13C. The length of a period between the points in time t4 and t5 is equal to a pulse width indicated by the second lighting control value output by the lighting control value determining unit 110.

FIGS. 12A to 12E are different from FIGS. 13A to 13E in a second control value and thus in the pulse width during the second period. Specifically, the pulse width during the second period is shorter in FIGS. 13A to 13E than in FIGS. 12A to 12E.

When the first lighting control value output by the lighting control value determining unit 110 is larger than the lower limit lighting control value, in the first period each light source is driven at the first lighting control value output by the lighting control value determining unit 110. For example, as depicted in FIG. 12C, in the first period the light source (1,1) is driven to remain on during a period between points in time t1 to t3, as depicted in FIG. 12C. The length of the period of the points in time t1 to t3 is equal to the pulse width indicated by the first lighting control value output by the lighting control value determining unit 110. In this regard, as is the case with Embodiment 1, a light source (2,1) may start lighting at alighting end time for a light source (1,1). However, light detection started at the point in time t1 ends at the point in time t2, that is, the needed detection time after the point in time t1. Thus, no problem occurs even when any other light source is on after the point in time t2. Consequently, in FIG. 12D, the light source (2,1) is driven to start lighting at the point in time t2 during the first period. As depicted in FIG. 12E, a light source (8,6) is PWM-controlled to start lighting 1/480 seconds after the start time of the divided period, as is the case with Embodiment 1.

Figure 13D:
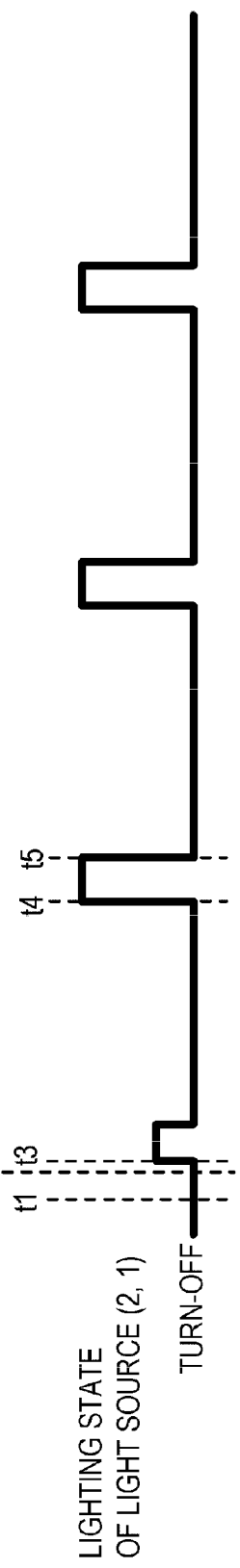
Figure 13E:
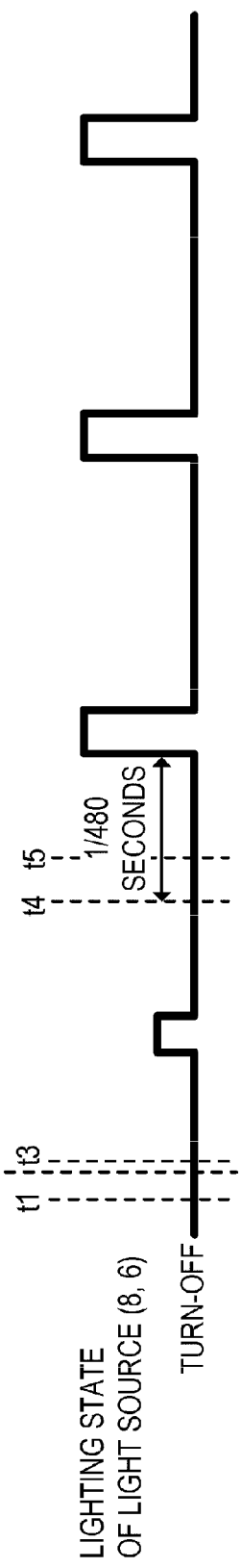

When the first lighting control value output by the lighting control value determining unit 110 is larger than the lower limit lighting control value, each light source is driven at the lower limit lighting control value during the first period. For example, during the first period, the light source (1,1) is driven to remain on during a period of points in time t1 to t3, as depicted in FIG. 13C. The length of the period of the points in time t1 to t3 is equal to the pulse width indicated by the lower limit lighting control value (that is, the needed detection time). In FIG. 13C, the period of the points in time t1 to t2 is indicative of the period of time for which the light source (1,1) is on when the light source (1,1) is driven at the first lighting control value output by the lighting control value determining unit 110. As depicted in FIG. 13D, the light source (2,1) starts lighting at the lighting end time t2 of the light source (1,1) as is the case with Embodiment 1. As depicted in FIG. 13E, the light source (8,6) is PWM-controlled to start lighting 1/480 seconds after the start time of the divided period as is the case with Embodiment 1.

As described above, according to Embodiment 2, when the lighting time during the second period intended to achieve the target brightness changes, the lighting time during the first period changes at the change rate of the lighting time during the second period. This enables a reduction in possible color shift resulting from the light emission during the first period. Specifically, the color shift can be reduced because the brightness ratio (chromaticity ratio) of the first period to the second period can be kept constant.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s).

This application claims the benefit of Japanese Patent Application No. 2013-229697, filed on Nov. 5, 2013, which is hereby incorporated by reference herein in its entirety.

What is claimed is:

1. A light source apparatus comprising:
    a light source;
    a detection unit configured to detect light emitted by the light source;
    a determination unit configured to determine a target brightness for the light source; and
    a control unit configured to periodically perform control of light emission from the light source,
    wherein the control unit divides one period of the control into a first period during which the light source is caused to emit light that is to be detected by the detection unit and a second period during which the light source is caused to emit light at the target brightness determined by the determination unit, and
    during the first period, drives the light source using a driving signal with a value smaller than a value during the second period, and
    the detection unit detects light emitted by the light source during the first period.

2. The light source apparatus according to claim 1, wherein the control unit generates a driving signal that causes the light source to be driven during the first period based on a driving signal that causes the light source to be driven during the second period.

3. The light source apparatus according to claim 1, wherein
the control unit changes a lighting time of the light source thereby changing an emission brightness of the light source, and
when a lighting time during the second period of achieving the target brightness determined by the determination unit changes, the control unit changes a lighting time during the first period at a change rate of the lighting time during the second period.

4. The light source apparatus according to claim 3, wherein when a time resulting from changing of the lighting time during the first period at the change rate is shorter than a needed detection time needed for the detection unit to detect light, the control unit sets the needed detection time as the lighting time during the first period.

5. The light source apparatus according to claim 1, wherein the control unit divides one period of the control into one first period and a plurality of second periods.

6. The light source apparatus according to claim 1, comprising a plurality of light sources,
wherein the control unit, while causing the light source to emit light that is to be detected by the detection unit, controls light emission from other light sources in such a manner that the detection unit detects only light emitted by the light source.

7. The light source apparatus according to claim 1, wherein
the light source apparatus is used for a display apparatus that displays an image on a screen by modulating light emitted by the light source apparatus, and
one period of the control is a period of one frame of image data displayed by the display apparatus.

8. The light source apparatus according to claim 1, wherein
the light source apparatus is used for a display apparatus that displays an image on a screen by modulating light emitted by the light source apparatus, and
the determination unit determines the target brightness based on image data displayed by the display apparatus.

9. A method for controlling a light source apparatus including:
a light source; and
a detection unit configured to detect light emitted by the light source,
the method comprising:
a determination step of determining a target brightness for the light source; and
a control step of periodically perform control of light emission from the light source,
wherein, in the control step,
one period of the control is divided into a first period during which the light source is caused to emit light that is to be detected by the detection unit and a second period during which the light source is caused to emit light at the target brightness determined in the determination step, and
during the first period, the light source is drove using a driving signal with a value smaller than a value during the second period, and
the detection unit detects light emitted by the light source during the first period.

10. The method according to claim 9, wherein, in the control step, a driving signal that causes the light source to be driven during the first period is generated based on a driving signal that causes the light source to be driven during the second period.

11. The method according to claim 9, wherein,
in the control step, a lighting time of the light source is changed thereby an emission brightness of the light source is changed, and
when a lighting time during the second period of achieving the target brightness determined in the determination step changes, in the control step, a lighting time during the first period is changed at a change rate of the lighting time during the second period.

12. The method according to claim 11, wherein when a time resulting from changing of the lighting time during the first period at the change rate is shorter than a needed detection time needed for the detection unit to detect light, in the control step, the needed detection time is set as the lighting time during the first period.

13. The method according to claim 9, wherein, in the control step, one period of the control is divided into one first period and a plurality of second periods.

14. The method according to claim 9, wherein
the light source apparatus includes a plurality of light sources, and
in the control step, while causing the light source to emit light that is to be detected by the detection unit, light emission from other light sources are controlled in such a manner that the detection unit detects only light emitted by the light source.

15. The method according to claim 9, wherein
the light source apparatus is used for a display apparatus that displays an image on a screen by modulating light emitted by the light source apparatus, and
one period of the control is a period of one frame of image data displayed by the display apparatus.

16. The method according to claim 9, wherein
the light source apparatus is used for a display apparatus that displays an image on a screen by modulating light emitted by the light source apparatus, and
in the determination step, the target brightness is determined based on image data displayed by the display apparatus.

17. A non-transitory computer readable medium that stores a program, wherein the program causes a computer to execute a method for controlling a light source apparatus having a light source and a sensor,
wherein the method includes:
a detection step in which the sensor detects light emitted by the light source;
a determination step of determining a target brightness for the light source; and
a control step of periodically performing control of light emission from the light source,
wherein in the control step, one period of the control is divided into a first period during which the light source is caused to emit light that is to be detected by the sensor and a second period during which the light source is caused to emit light at the target brightness determined in the determination step,
wherein during the first period, the light source is driven using a driving signal with a value smaller than a value during the second period,
and wherein in the detection step, the sensor detects light emitted by the light source during the first period.

* * * * *